United States Patent
Collotta et al.

(10) Patent No.: US 8,817,904 B2
(45) Date of Patent: Aug. 26, 2014

(54) METHOD FOR SELECTING A PRECODING MATRIX IN A MULTIPLE INPUT MULTIPLE OUTPUT ("MIMO") SYSTEM

(75) Inventors: Ivano Salvatore Collotta, Turin (IT); Gian Michele Dell'Aera, Turin (IT); Bruno Melis, Turin (IT); Fabio Mondin, Turin (IT); Paolo Priotti, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/520,028

(22) PCT Filed: Dec. 30, 2009

(86) PCT No.: PCT/IT2009/000593
§ 371 (c)(1),
(2), (4) Date: Aug. 15, 2012

(87) PCT Pub. No.: WO2011/080774
PCT Pub. Date: Jul. 7, 2011

(65) Prior Publication Data
US 2013/0003812 A1    Jan. 3, 2013

(51) Int. Cl.
H04B 7/02    (2006.01)

(52) U.S. Cl.
USPC ............ 375/267; 375/299; 375/347; 455/101

(58) Field of Classification Search
None
See application file for complete search history.

(56) References Cited

U.S. PATENT DOCUMENTS

| | | |
|---|---|---|
| 2007/0165738 A1 | 7/2007 | Barriac et al. |
| 2008/0112500 A1 | 5/2008 | Pan et al. |
| 2008/0188190 A1 * | 8/2008 | Prasad et al. ............... 455/114.3 |
| 2008/0232503 A1 | 9/2008 | Kim |
| 2008/0304463 A1 | 12/2008 | Borkar et al. |
| 2009/0046800 A1 * | 2/2009 | Xu et al. ....................... 375/267 |
| 2011/0268072 A1 * | 11/2011 | Lee et al. ...................... 370/329 |
| 2013/0100996 A1 * | 4/2013 | Clerckx et al. ............... 375/219 |

FOREIGN PATENT DOCUMENTS

| | | |
|---|---|---|
| CN | 101499834 A | 8/2009 |
| CN | 101611569 A | 12/2009 |
| WO | WO 2006/023832 A2 | 3/2006 |
| WO | WO 2008/054737 A2 | 5/2008 |
| WO | WO 2008/116181 A2 | 9/2008 |
| WO | WO 2009/023681 A2 | 2/2009 |

OTHER PUBLICATIONS

English-language International Search Report issued by the European Patent Office in International Application No. PCT/IT/2009/000593 mailed Oct. 25, 2010.
Love et al.: "Limited Feedback Unitary Precoding for Spatial Multiplexing Systems", IEEE Transactions on Information Theory, vol. 51, No. 8, pp. 2967-2976 (2005).
Corresponding Office Action for Chinese Patent Application No. 200980163443.X, issued May 6, 2014.

* cited by examiner

*Primary Examiner* — Adolf DSouza
(74) *Attorney, Agent, or Firm* — Finnegan, Henderson, Farabow, Garrett & Dunner, L.L.P.

(57) ABSTRACT

A method is provided for selecting a precoding matrix to be used in an MIMO communication system. The MIMO communication system includes a transmitter, a receiver and a communication channel. The precoding matrix is used by the transmitter to precode codewords to be transmitted to the receiver over the communication channel. At the receiver, an optimum precoding matrix within a codebook of precoding matrices is determined based on a metric related to the power of received signal layers. An indication is then fed back from the receiver to the transmitter to enable the transmitter to select the optimum precoding matrix from the codebook.

12 Claims, 5 Drawing Sheets

METHOD FOR SELECTING A PRECODING MATRIX IN A MULTIPLE INPUT MULTIPLE OUTPUT ("MIMO") SYSTEM

CROSS REFERENCE TO RELATED APPLICATION

This application is a national phase application based on PCT/IT2009/000593, filed Dec. 30, 2009.

BACKGROUND OF THE INVENTION

1. Field of the Invention

The present invention relates to the field of "Multiple Input Multiple Output" ("MIMO") communication systems adopting precoding techniques. More particularly, the present invention concerns a method for the selection of the optimum precoding matrix.

2. Overview of the State of the Art

Precoding is an attractive scheme that makes multiple antenna systems more robust against rank deficient channels, and provides improved performance with a limited increase in the receiver complexity.

Basically, linear precoding is realized by multiplying the layered signal (to be transmitted over a MIMO transmission channel) for a matrix, called "precoding matrix". A "layered signal" is a signal formed by one or multiple layers that are transmitted in parallel over the radio channel through a plurality of antennas, and wherein each layer represents an independent data stream. In the following, the term "stream" is then often used as a synonym of layer.

The optimum precoding matrix is a function of the Channel State Information (CSI), which is often available only at the receiver. Thus, the information required to select the optimum precoding matrix must be fed back to the transmitter over a feedback communication link or channel, which is typically limited in terms of data rate.

The precoding matrix is chosen from a finite set of precoding matrices, said finite set being called "codebook", known to both the receiver and the transmitter. The receiver chooses the optimal precoding matrix from the codebook as a function of the current CSI and sends a binary index of the chosen matrix to the transmitter over the feedback channel. The matrix index is denoted as Precoding Matrix Index (PMI).

Linear precoding techniques are used in recent wireless communication systems such as the LTE (Long Term Evolution) system, currently under standardization in 3GPP (Third Generation Partnership Project), and the WiMAX (Worldwide Interoperability for Microwave Access) system. For example, in case of the LTE system the linear precoding is based on a codebook and can be used both in case of single layer transmission and in case of multiple layer transmission (i.e. in case of spatial multiplexing, a transmission technique used in MIMO communication systems to transmit independent and separately encoded data signals, so-called codewords, from each of the multiple transmit antennas; the space dimension is thus reused, or multiplexed, more than one time). The term "codeword" refers to a data flow that is encoded and modulated independently under the control of the Adaptive Modulation and Coding (AMC) procedure. In practical systems such as the LTE the number of codewords is limited to $n_{CW}=2$ because it represents a good trade-off between achievable performance and system complexity. After encoding and modulation the $n_{CW}$ codewords are mapped over the $n_{lay} \geq n_{CW}$ layers in the layer mapping block. The simplest mapping rule can be a one-to-one mapping in the case that the number of codeword is equal to the number of layers (i.e. $n_{CW}=n_{lay}$). In general, when the number of layers is larger that the number of codewords (i.e. $n_{lay}>n_{CW}$), the layer mapping block acts as a demultiplexer that maps one codeword over two or more layers.

The selection of the optimum precoding matrix is performed at the User Equipment (UE) as a function of the current CSI. The selection criteria implemented at the UE is not standardized and thus can be optimized by a given UE manufacturer in order to find the best trade-off between performance and complexity.

In case of MIMO-OFDM (Orthogonal Frequency Division Multiplexing) based systems, the PMI feedback must be provided for each subcarrier or at least for each group of adjacent subcarriers, due to the frequency selectivity of the channel. This means that the signalling overhead may become significant and, thus, several methods have been studied to reduce such feedback by exploiting, for instance, the correlation of the optimal precoding matrix over adjacent subcarriers.

One important aspect in the application of precoding in MIMO communication systems is the definition of a suitable selection function to be used at the receiver for the selection of the optimum precoding matrix as a function of the current CSI. In general, the selection function depends on the receiver type, on the characteristics of the precoding matrices that form the codebook and also on the metrics that are maximized or minimized by the function (e.g. Bit Error Rate—BER—, Signal to Noise Ratio—SNR—, minimum distance of the constellation at the receiver, capacity, practical rank, etc.).

In literature there are few examples of selection functions that can be used in case of unitary precoding. One exemplary function is provided in D. J. Love, R. W. Heath, Jr., "Limited Feedback Unitary Precoding for Spatial Multiplexing Systems". IEEE Transactions On Information Theory, Vol. 51, No. 8, August 2005. Specifically, in this reference it is indicated that one possible precoding selection function S is the one that maximizes the SINR after spatial demultiplexing of the weakest layer in case of transmission of multiple layers (i.e. for $n_{lay}>1$). In formulas this selection criterion can be expressed as follows:

$$\underline{F}_m = \max_{j \in \{1,2,\ldots,M\}} \{\min(SNR_1^{(j)}, SNR_2^{(j)}, \ldots, SNR_{n_{lay}}^{(j)})\}$$

where the selection of the optimum precoding matrix $\underline{F}_m$ requires the computation of the SINR (Signal to Interference and Noise Ratio) of each of the $n_{lay}$ received layers. This computation involves the inversion of a complex matrix with size $n_{lay} \times n_{lay}$ that must be repeated for each matrix in the codebook (i.e. M times, if M is the number of precoding matrices belonging to the codebook) and for each subcarrier or group of adjacent subcarriers (i.e. $N_{SC}$ times if $N_{SC}$ is the number of used subcarriers). The inversion of such matrix involves a significant computation load at the user terminal especially when the number of transmitted layers is larger than 2 (i.e. $n_{lay}>2$). In addition the mathematical expression of the SINR after spatial demultiplexing is available in case of linear receivers, such as MMSE (Minimum Mean Square Error) or ZF (Zero Forcing), but for other spatial demultiplexing algorithms it can be very difficult to determine a correspondent mathematical expression.

Another example of selection function is provided in WO 2006/023832 where it is described a method for providing closed loop transmit precoding by using a codebook formed of unitary matrices. Also in this case the selection of the precoding matrix is based on the weakest stream maximization where, of the P received streams, the smallest SINR value is maximized over the matrices in the codebook.

US 20080188190 describes a Multi-Rank BeamForming (MRBF) scheme in which the downlink channel is estimated and an optimal precoding matrix to be used by the MRBF transmitter is determined accordingly. The optimal precoding matrix is selected from a codebook of matrices having a recursive structure which allows for efficient computation of the optimal precoding matrix and corresponding SINR. The codebook also enjoys a small storage footprint. Due to the computational efficiency and modest memory requirements, the optimal precoding determination can be made at user equipment (UE) and communicated to a transmitting base station over a limited uplink channel for implementation over the downlink channel.

In general an adaptive MIMO system automatically switches from the spatial multiplexing to other MIMO techniques when the SINR and/or the practical rank decrease. An example of technique suitable for low SINR values is Space Time Coding (STC). However in real communication systems the adaptation procedure can be affected by errors and/or delays and therefore a selection function that is not optimal in the low SINR region may cause an undesired performance degradation.

SUMMARY OF THE INVENTION

The Applicant has observed that the selection function based on the weakest stream maximization is optimal in the high SINR region where an adaptive MIMO system will likely use the spatial multiplexing technique. In the low SINR region, the weakest stream maximization criterion is not optimal and may provide lower performance than the system without precoding.

The Applicant has then noted that there is the need of a preceding matrix selection function that is applicable in case of unitary precoding and that provides performance gains for both low and high values of SINR and practical rank. Besides, this selection function should be simple in order to avoid complex calculations such as matrix inversions, that are in general difficult to be implemented at the receiver (user terminal).

The Applicant has also noted that the selection of the precoding matrix has a strong influence on the selection of the optimum AMC state (Adaptive Modulation and Coding, i.e. the optimum modulation and coding scheme to be used for each transmitted codeword) and thus there is also the need of an integrated method for selecting precoding matrix and AMC state.

The present invention tries to solve the problems stated above by defining a precoding matrix selection function that provides performance improvement also for low values of SINR and practical rank and thus avoids any performance degradation if the MIMO adaptation procedure is affected by errors and/or delays.

Essentially, according to an embodiment of the present invention, a method is proposed in which in a first step the optimum precoding matrix is determined on the base of a metric related to the power of the received layers before spatial demultiplexing. In a second step, by using the precoding matrix selected in the first step, the instantaneous SINR of each received layer before spatial demultiplexing is calculated, and the optimum Modulation and Coding Scheme (MCS) to be used for each of said codewords is determined.

According to an aspect of the present invention, there is provided a method for selecting a precoding matrix to be used in a MIMO communication system comprising a transmitter, a receiver and a communication channel, wherein the precoding matrix is used by the transmitter to precode codewords to be transmitted to the receiver over the communication channel.

The method comprises:
at the receiver, determining an optimum precoding matrix within a codebook of precoding matrices, said determining being made on the base of a metric related to the power of received signal layers, and
feeding back from the receiver to the transmitter an indication useful to enable the transmitter to select the optimum precoding matrix from the codebook.

Said step of determining the optimum precoding matrix is advantageously performed on the received signal layers before spatially demultiplexing the received signal layers.

The method may further comprise having the receiver, using the determined optimum preceding matrix, determining for each of said codewords a respective optimum Channel Quality Indicator to be used for said codeword, and feeding back from the receiver to the transmitter an indication of the determined Channel Quality Indicators useful to enable the transmitter to select the optimum Modulation and Coding Scheme to be used for each of said codewords.

Said determining the optimum preceding matrix may comprise selecting from the codebook the preceding matrix for which the product of the powers of the received layers is minimized.

Said determining the optimum Channel Quality Indicator may comprise calculating instantaneous Signal to Interference and Noise Ratio of each received codeword.

In particular, said calculating the instantaneous Signal to Interference and Noise Ratio of each received codeword may comprise calculating the instantaneous Signal to Interference and Noise Ratio of each received layer before spatial demultiplexing.

Said determining the optimum Channel Quality Indicator may comprise setting thresholds for the Signal to Interference and Noise Ratio and comparing the calculated Signal to Interference and Noise Ratio with said thresholds. Said thresholds are preferably dynamically calculated by the receiver as a function of calculated values of predetermined parameters, like for example at least one among correlation coefficients between transmit antennas of the transmitter, correlation coefficients between receive antennas at the receiver, a speed of movement of the receiver relative to the transmitter.

Alternatively, said determining the optimum precoding matrix may comprise:
calculating, for each precoding matrix in the codebook, the instantaneous Signal to Interference and Noise Ratio of each received codeword before spatial demultiplexing;
selecting a Channel Quality Indicator that maximizes a throughput of each received codeword;
calculating a sum of throughputs of the received codewords; and
selecting as optimum precoding matrix for which the calculated sum of throughputs is maximized.

The method may in this case further comprise selecting as optimum Channel Quality Indicator that which maximizes the calculated sum of throughputs.

The above operations are preferably repeated for every group of subcarriers.

Another aspect of the present invention relates to a MIMO receiver configured to implement the method according to any one of the preceding claims.

BRIEF DESCRIPTION OF THE DRAWINGS

These and other features and advantages of the present invention will be made apparent by the following detailed description of possible invention embodiments; the following description will be best understood making reference to the annexed drawings, wherein.

DETAILED DESCRIPTION OF EMBODIMENTS OF THE INVENTION

Figure 1:
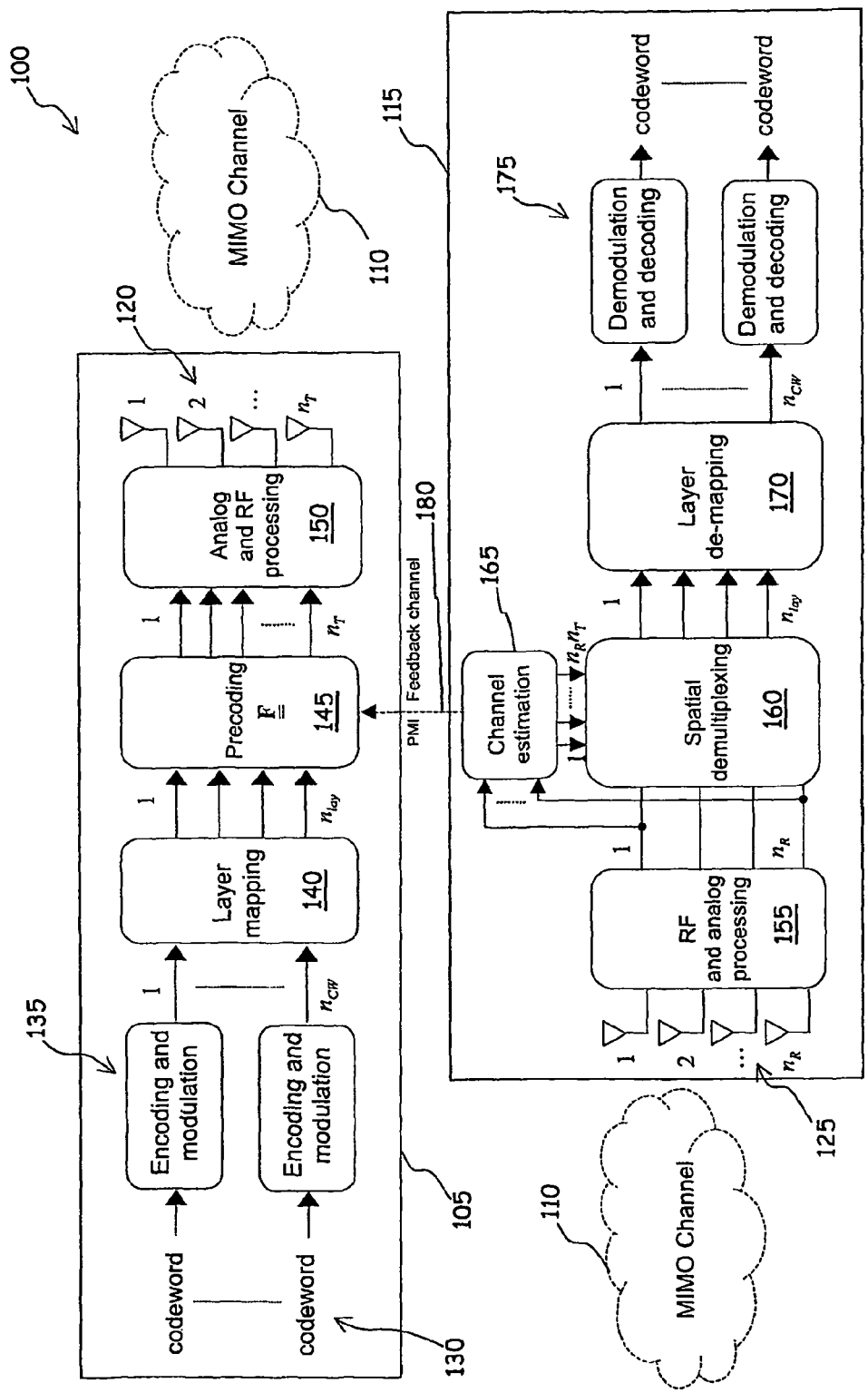
FIG. 1 shows a simplified block diagram of an exemplary MIMO communication system that uses precoding.

FIG. 1 shows a simplified block diagram of an exemplary MIMO communication system 100 that uses precoding. The MIMO communication system 100 includes a transmitter 105, a MIMO communication channel 110 and a receiver 115. The transmitter 105 may for example be a base station of a cellular telephony network, e.g. compliant to the LTE standard, while the receiver may be a User Equipment (UE).

In the following, reference will be made for simplicity to a narrowband MIMO system with $n_T$ transmit antennas 120 and $n_R$ receive antennas 125, transmitting $n_{lay} \leq \min(n_T, n_R)$ parallel data layers. The narrowband signal modelling is also applicable when referring to a generic subcarrier in case of a wideband communication system that uses the OFDM (Orthogonal Frequency Division Multiplexing) technique.

The MIMO communication system of FIG. 1 is designed to transmit a certain number $n_{CW}$ of codewords 130. After encoding and modulation in an encoding and modulation block 135, the $n_{CW}$ encoded and modulated codewords 130 are mapped, in a layer mapping block 140, over the $n_{lay}$ layers. The simplest mapping rule can be a one-to-one mapping in the case that the number of codewords is equal to the number of layers (i.e. $n_{CW} = n_{lay}$). In general, when the number $n_{lay}$ of layers is larger that the number of codewords $n_{CW}$ (i.e. $n_{lay} > n_{CW}$), the layer mapping block 140 acts as a demultiplexer that maps one codeword over two or more layers.

After the layer mapping procedure, the layers are multiplied by the precoding matrix $\underline{\underline{F}} \in C^{n_T, n_{lay}}$ in a precoding block 145. The $n_T$ signals at the output of the precoding block 145 are then converted from digital to analog, filtered and up-converted to radiofrequency (RF) in block 150, and then radiated by the $n_T$ antennas 120 over the MIMO radio channel 110. It should be noted that the number of transmit antennas 120 is in general equal to or larger than the number of layers (i.e. $n_T \geq n_{lay}$).

At the receiver 115, the signals are received by the $n_R$ receive antennas 125, the received signals are down-converted from RF, filtered and converted from analog to digital in block 155, then they are spatially demultiplexed in block 160, based on a channel estimation made in a channel estimation block 165. Block 170 then performs a layer demapping procedure, and the codewords are then demodulated and decoded in 175. Based on the channel estimation made in block 165, the receiver 115 sends back to the transmitter 105, on a feedback channel 180, a Precoding Matrix Index (PMI), used by the transmitter 105 to select from the codebook the precoding matrix to be used. The receiver 115 sends back to the transmitter 105 over the feedback channel 180 not only the PMI but also other feedback information, and in particular the CQI (Channel Quality Indicator). The CQI represents the optimal modulation and coding scheme (MCS) that should be used for a respective codeword in order to reach a predefined level of received signal quality, that for example, like in many systems, is set equal to a target BLER (Block Error Rate) of 10%.

In the mathematical description provided hereafter, vectors are underlined and in boldface. Matrices are double underlined and in boldface. The symbols $(\cdot)^T$ and $(\cdot)^H$ denote the transpose and the conjugate-transpose operations, respectively.

The signal model at the discrete time instant n is given by the equation below:

$$\underline{y}[n] = \underline{\underline{H}}[n] \cdot \underline{\underline{F}}[n] \cdot \underline{s}[n] + \underline{v}[n] \qquad \text{eq. (1)}$$

where $\underline{y} \in C^{n_R, 1}$ is the received signal vector at the input of the spatial demultiplexing block 160, $\underline{v} \in C^{n_R, 1}$ is the additive noise plus interference vector, $\underline{s} \in C^{n_{lay}, 1}$ is the data vector at the output of the layer mapping block 140, $\underline{\underline{H}} \in C^{n_R, n_T}$ is the MIMO channel matrix, and $\underline{\underline{F}} \in C^{n_T, n_{lay}}$ is a generic precoding matrix taken from the codebook. The codebook is denoted with $\Im$ and is composed by M matrix elements, where M is denoted as codebook size:

$$\Im = \{\underline{\underline{F}}_1, \underline{\underline{F}}_2, \ldots, \underline{\underline{F}}_M\} \qquad \text{eq. (2)}$$

In the following it is assumed that the transmitted signal vector $\underline{x} = \underline{\underline{F}} \cdot \underline{s}$ is normalized so that the total transmit power is equal to $\epsilon_s = E(\underline{x}^H \underline{x})$. The entries of the noise vector $\underline{v}$ are complex gaussian variables with zero mean and variance $N_0$, while the entries of the channel matrix $\underline{\underline{H}}$ are complex gaussian variables with zero mean and unitary variance. The channel matrix $\underline{\underline{H}}$ is estimated at the receiver 115 by means of suitable training sequences that are transmitted together with the data symbols.

It is also denoted as equivalent channel matrix $\underline{\underline{H}}_{eq} = \underline{\underline{H}} \cdot \underline{\underline{F}}$ the equivalent channel formed by the cascade of the precoding matrix $\underline{\underline{F}}$ applied at the transmitter 105 and the actual propagation channel $\underline{\underline{H}}$. The size of the equivalent channel matrix is $n_R \times n_{lay}$ and it provides the mapping of the $n_{lay}$ layers at the transmitter 105 over the $n_R$ received signals.

The LTE system, taken here as an example, uses a codebook $\Im$ that is composed by unitary matrices. These matrices are also designed in order to keep balanced the average power transmitted by the different antennas. In mathematics, a unitary matrix is an n by n complex matrix $\underline{\underline{F}}$ satisfying the condition:

$$\underline{\underline{F}}^H \cdot \underline{\underline{F}} = \underline{\underline{F}} \cdot \underline{\underline{F}}^H = \underline{\underline{I}} \qquad \text{eq. (3)}$$

where $\underline{\underline{I}}$ is an n×n identity matrix.

The use of unitary precoding matrices is a good trade-off between achievable performance and implementation complexity, but limits the possible precoding matrix selection functions S that can be used at the receiver 115.

For example, any criteria based on the determinant of the equivalent channel matrix cannot be used. Recalling the Binet theorem and remembering that a unitary matrix has a determinant of unitary modulus, it is possible to write:

$$|\det(\underline{\underline{H}} \cdot \underline{\underline{F}})| = |\det(\underline{\underline{H}})| \cdot |\det(\underline{\underline{F}})| = |\det(\underline{\underline{H}})|, \text{ where } |\det(\underline{\underline{F}})| = 1 \qquad \text{eq. (4)}$$

where the symbol $|c|$ denotes the modulus of a complex number c and $\det(\underline{\underline{A}})$ is the determinant of a matrix $\underline{\underline{A}}$.

Similarly, any criteria based on the singular values $\lambda_i$ is not applicable because the singular values of the channel matrix $\underline{\underline{H}}$ are not modified by the unitary precoding matrix $\underline{\underline{F}}$. Recalling that the singular values of a generic matrix $\underline{\underline{A}}$ are the eigenvalues of $\underline{\underline{A}} \cdot \underline{\underline{A}}^H$, it is:

$$\lambda_i = \text{eig}(\underline{\underline{H}}_{eq} \cdot \underline{\underline{H}}_{eq}^H) = \text{eig}[\underline{\underline{H}} \cdot \underline{\underline{F}} \cdot (\underline{\underline{H}} \cdot \underline{\underline{F}})^H] = \text{eig}[\underline{\underline{H}} \cdot \underline{\underline{F}} \cdot \underline{\underline{F}}^H \cdot \underline{\underline{H}}^H] = \text{eig}[\underline{\underline{H}} \cdot \underline{\underline{H}}^H] \qquad \text{eq. (5)}$$

where the function eig(·) calculates the eigenvalues and i=1, 2, . . . , r, where r is the rank of the channel matrix $\underline{H}$.

It is known from the theory that the capacity of the MIMO channel 110 in the absence of channel knowledge at the transmitter 105 is given by the expression:

$$C = \sum_{i=1}^{r} \log_2\left(1 + \frac{\varepsilon_S}{n_T N_0}\lambda_i\right) \quad \text{eq. (6)}$$

Equation (6) expresses the capacity of the MIMO channel 110 as the sum of the capacities of r SISO (Single Input Single Output) channels, each having power gain $\lambda_i$ and transmit power $\varepsilon_s/n_T$. However, any precoding matrix selection function S based on the MIMO channel capacity cannot be used because this metric is not affected by the unitary precoding.

Similarly, the practical rank taken alone is not suitable as a selection metric. The practical rank is usually defined as the ratio between the smallest singular value and the largest singular value:

$$\text{prank} = \frac{\min_i(\lambda_i)}{\max_i(\lambda_i)} \quad \text{eq. (7)}$$

The practical rank is comprised in the interval [0; 1] and a low value indicates a bad-conditioned MIMO channel 110 that is not suitable for spatial multiplexing transmission, whereas a value near to unity indicates a good MIMO channel 110 that is suitable for the transmission of multiple parallel data streams. However, due to the relation given in the equation (5), also the practical rank is not modified by the unitary precoding operation.

Referring again to FIG. 1, in the system 100 the MIMO transmitter 105 generates $n_{CW}$ codewords 130. In the MIMO terminology, one "codeword" represents one data flow that is encoded and modulated independently under the control of the AMC (Adaptive Modulation and Coding) procedure. Each codeword is encoded within the MIMO transmitter 105 by a suitable channel encoder (i.e. convolutional, turbo code, LDPC, etc.), to protect the data against errors, and then modulated according to the well known schemes such QPSK, 16-QAM, 64-QAM, etc.

As stated above, in systems, like for example LTE, the maximum number of codewords is equal to $n_{CW}=2$.

The codewords are mapped onto the $n_{lay}$ layers (in block 140). The simplest mapping rule corresponds to the one-to-one mapping where one codeword is mapped over one layer. One codeword can also be mapped over two or more layers when the number of layers $n_{lay}$ is larger than the number of codewords (i.e. $n_{lay} > n_{CW}$). In this case the simplest mapping rule is the demultiplexing or serial to parallel conversion of the codeword over the different layers.

The $n_{lay}$ layers are then multiplied in the precoder (block 145) by the matrix $\underline{F}_m$ thus providing $n_T \geq n_{layers}$ signals that are converted from digital to analog, up-converted to radiofrequency (RF) and radiated by the $n_T$ transmit antennas (block 150). The $n_T$ transmitted signals propagate over the MIMO radio channel 110, modelled by the matrix $\underline{H}$, and are received by the $n_R$ receive antennas 125 at the receiver 115.

The MIMO receiver 115 performs the spatial demultiplexing and separates the original $n_{lay}$ transmitted layers that where mixed when propagating over the channel 110. For example the MIMO receiver 115 can be realized by means of an MMSE (Minimum Mean Square Error) spatial demultiplexing algorithm that multiplies the received signal vector $\underline{y}$ for a demultiplexing matrix $\underline{G}_{MMSE}$ with size $n_{lay} \times n_R$ and given by:

$$\underline{G}_{MMSE} = \sqrt{\frac{n_T}{\varepsilon_S}} \cdot \left(\underline{H}_{eq}^H \underline{H}_{eq} + \frac{n_T N_0}{\varepsilon_S} I_{n_{lay}}\right)^{-1} \underline{H}_{eq}^H \quad \text{eq. (8)}$$

where $\underline{H}_{eq} = \underline{H} \cdot \underline{F}_m$ in the equation (8) is the equivalent channel matrix correspondent to the precoding matrix $\underline{F}_m$ used at the transmitter side. The $n_{lay}$ received layers are then expressed by the equation below:

$$\underline{\hat{s}} = \underline{G}_{MMSE} \underline{y} \quad \text{eq. (9)}$$

The MMSE receiver 115 described above is just an example and the invention is not limited to the MMSE receiver only. The proposed method for selecting the optimum precoding matrix and AMC state can also be applied to other receiver types such for example Zero Forcing (ZF), Successive Interference Cancellation receivers (e.g. V-BLAST) or Maximum Likelihood receivers (e.g. QRD-M).

In order to describe the principle of the invention, reference is made to a $n_T \times n_R$ MIMO system with $n_T$ transmit antennas and $n_R$ receive antennas, like the system 100 shown in FIG. 1. It is also supposed that the system generates $n_{CW}$ codewords that are mapped over $n_{lay}$ layers.

Figure 2A:
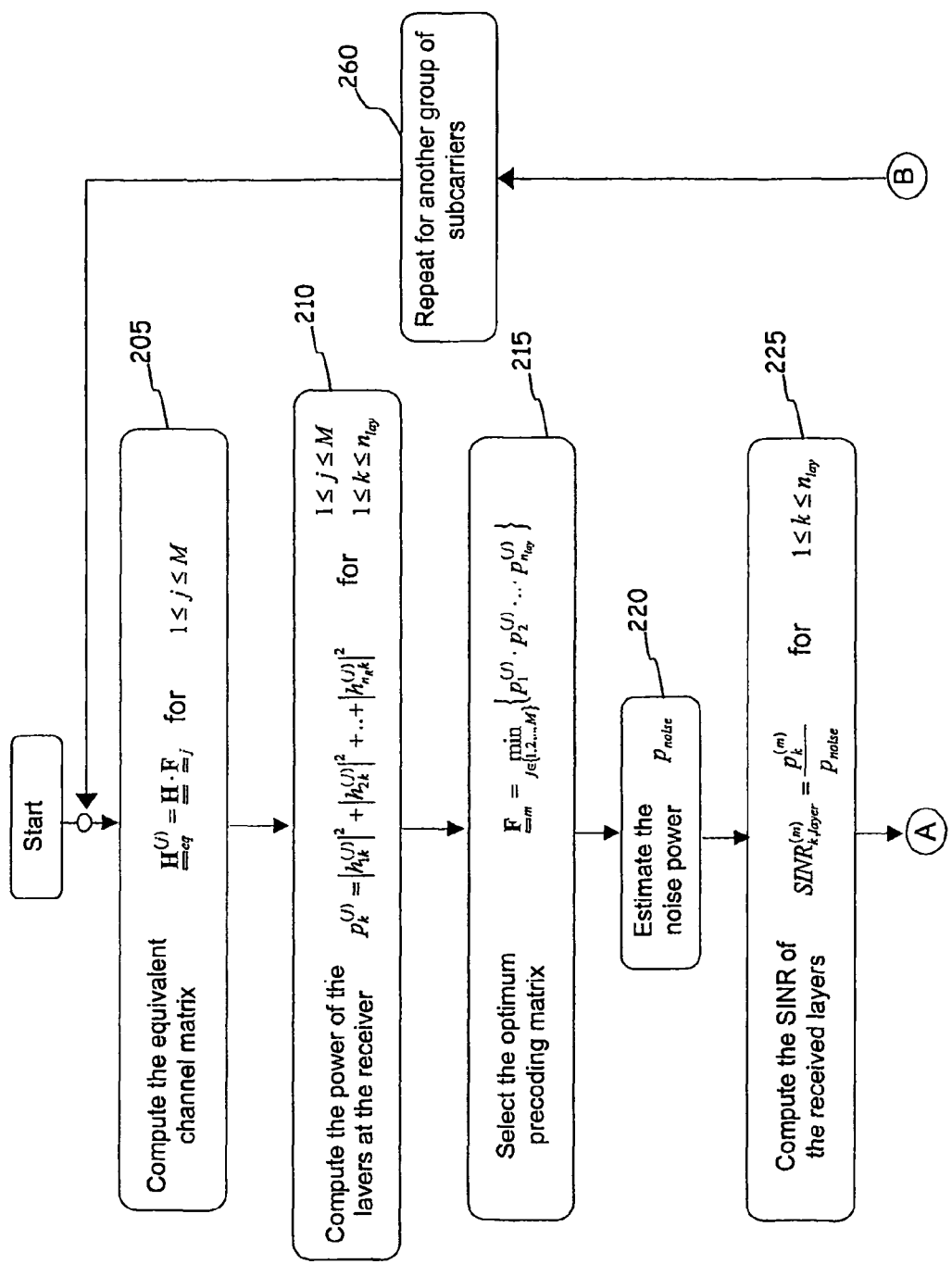
FIGS. 2A and 2B are a flow diagram of some steps of a method according to an embodiment of the present invention.
Figure 2B:
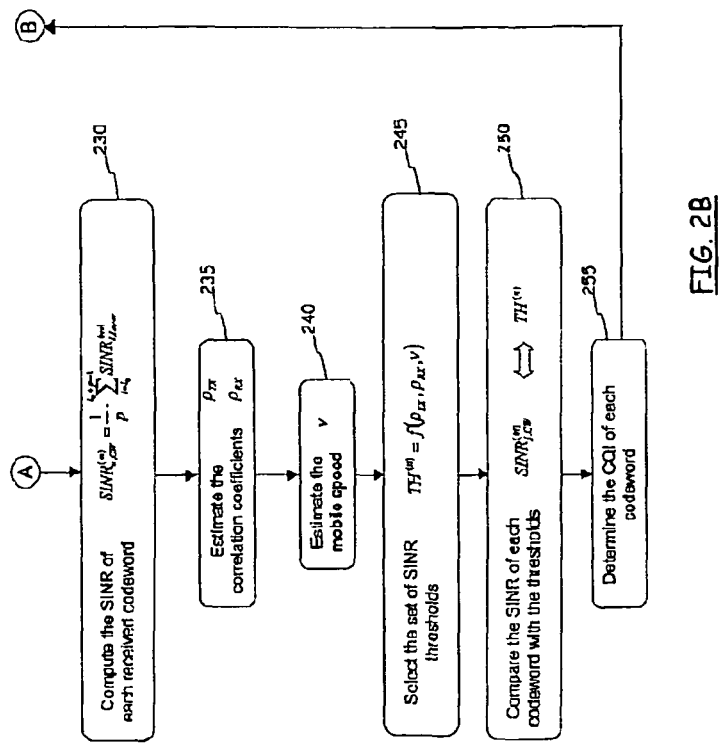

A flow diagram of a method according to an embodiment of the present invention is given in FIGS. 2A and 2B.

A first step of the method is the calculation of the power of each layer at the input of the spatial demultiplexing block 160. This calculation is performed at the receiver 115 and is repeated for each of the M precoding matrices in the codebook $\mathfrak{S}$. Firstly, the equivalent channel matrix $\underline{H}_{eq}^{(j)} = \underline{H} \cdot \underline{F}_j$ is computed (block 205 in the flow diagram of FIG. 2A). As said before, the equivalent channel matrix $\underline{H}_{eq}^{(j)} = \underline{H} \cdot \underline{F}_j$ maps the layers at the transmitter 105 over the $n_R$ received signals. Then, the power of the layers at the receiver 115 is calculated (block 210 in the flow diagram of FIG. 2A). The power of the k-th received layer is equal to the squared sum of the elements in the k-th column of the equivalent channel matrix. In case of a MIMO 2×2 system with $n_{lay}=n_R=2$ the equivalent channel matrix has the structure shown below:

$$\underline{H}_{eq}^{(j)} = \underline{H} \cdot \underline{F}_j = \begin{bmatrix} h_{11}^{(j)} & h_{12}^{(j)} \\ h_{21}^{(j)} & h_{22}^{(j)} \end{bmatrix} \text{ with } 1 \leq j \leq M \quad \text{eq. (10)}$$

The power of the first and of the second received layer is then equal to:

$$p_1^{(j)} = |h_{11}^{(j)}|^2 + |h_{21}^{(j)}|^2$$

$$p_2^{(j)} = |h_{12}^{(j)}|^2 + |h_{22}^{(j)}|^2 \quad \text{eq. (11)}$$

with $1 \leq j \leq M$

In general, for a $n_T \times n_R$ MIMO system with $n_{lay}$ layers, the power of the k-th layer at the user equipment receiver 115 can be expressed as:

$$p_k^{(j)} = |h_{1k}^{(j)}|^2 + |h_{2k}^{(j)}|^2 + \ldots + |h_{n_R k}^{(j)}|^2 \quad \text{eq. (12)}$$

with $1 \leq j \leq M$
$1 \leq k \leq n_{lay}$

According to an embodiment of the present invention, the optimum precoding matrix is selected as the one that minimizes the product of the powers of the received layers measured at the input of the spatial demultiplexing block 160. In formulas this can be expressed as follows:

$$F_m = \min_{j \in \{1,2,...,M\}} \{p_1^{(j)} \cdot p_2^{(j)} \cdot ... \cdot p_{n_{lay}}^{(j)}\} \quad \text{eq. (13)}$$

The m-th precoding matrix in the codebook is then selected (block 215 in the flow diagram of FIG. 2A) as the optimal one according to the criterion given in the equation (13).

After the selection of the optimum precoding matrix it is then possible to calculate the Signal to Interference plus Noise (SINR) of the $n_{lay}$ received layers at the input of the spatial demultiplexing block 160 (block 220 in the flow diagram of FIG. 2A). The SINR of the received layers are denoted as $SINR_{k,layer}^{(m)}$, where k is the layer index, and are expressed as follows:

$$SINR_{k,layer}^{(m)} = \frac{p_k^{(m)}}{p_{noise}} \text{ with } 1 \le k \le n_{lay} \quad \text{eq. (14)}$$

where $p_{noise}$ is the noise plus interference power at the input of the spatial demultiplexing block 160 that can be estimated by means of proper training sequences transmitted on the pilot subcarriers. The measure of $p_{noise}$ can be eventually calculated as the average over the $n_R$ receive antennas.

The SINR values of the $n_{lay}$ received layers calculated with the equation (14) are then used to determine the AMC state, which in turn represents the optimum modulation and coding scheme to be used for each codeword in order to maximize the instantaneous throughput. In system such as the LTE, the AMC state is mapped over an indicator denoted as Channel Quality Indicator (CQI) that is provided as feedback (over the feedback channel 180) by the receiver 115 to the transmitter 105. The CQI is normally an integer number that has a one-to-one mapping over a reference set of transport formats that are described in terms of modulation and channel coding rates.

One method for determining the AMC state or CQI consist in the determination of a set of SINR thresholds that indicate the range of SINR values where a particular AMC state is optimum in terms of a specific radio quality parameter such as throughput, BLER, etc.

The SINR values of the $n_{lay}$ received layers, calculated with the equation (14), are used to determine the SINR of the $n_{CW}$ codewords (block 230 in the flow diagram of FIG. 2B). In case of one-to-one mapping, where one layer is mapped on one codeword, the SINR of the k-th layer is simply equal to the SINR of the k-th codeword. By denoting as $SINR_{k,CW}^{(m)}$ the SINR of the k-th codeword it is possible to write:

$$SINR_{k,CW}^{(m)} = SINR_{k,layer}^{(m)} \quad \text{eq. (15)}$$

$1 \le k \le n_{lay}$

When one codeword is mapped over two or more layers some transformation function should be used. For example, if the u-th codeword is mapped on p consecutive layers the average represents one possible mapping function:

$$SINR_{u,CW}^{(m)} = \frac{1}{p} \cdot \sum_{l=l_0}^{l=l_0+p-1} SINR_{l,layer}^{(m)} \text{ with } 1 \le u \le n_{CW} \quad \text{eq. (16)}$$

Also an effective SINR can be used in order to map the SINR of the layers over the correspondent codeword. In such a case the SINR of the u-th codeword can be expressed as follows:

$$SINR_{u,CW}^{(m)} = \exp\left(\sum_{l=l_0}^{l=l_0+p-1} \ln(1 + SINR_{l,layer}^{(m)})\right) \quad \text{eq. (17)}$$

with $1 \le u \le n_{CW}$

The SINR thresholds mentioned above are in general a function of several parameters such as for example the channel correlation and the user terminal speed. Correlation coefficients are thus calculated (block 235 in the flow diagram of FIG. 2B). The channel correlation can be estimated at the receiver 115 by means of the training sequences transmitted on the pilot subcarriers. For example the correlation between two transmit antennas 120 or between two receive antennas 125 can be calculated by means of the elements of the channel matrix $\underline{H}$, which is known at the receiver 115. By denoting the channel matrix $\underline{H}$ as follows:

$$\underline{H} = \begin{bmatrix} c_{11} & c_{12} & ... & c_{1n_T} \\ c_{21} & ... & ... & c_{2n_T} \\ ... & & & ... \\ c_{n_R 1} & & & c_{n_R n_T} \end{bmatrix} \quad \text{eq. (18)}$$

the fading correlation $\rho_{TX}^{(pq)}$ between the p-th and the q-th transmit antennas 120 can be calculated as follows:

$$\rho_{TX}^{(pq)} = E\{c_{rp} c_{rq}^*\} \quad \text{eq. (19)}$$

with $1 \le r \le n_R$

In a similar way the fading correlation $\rho_{RX}^{(pq)}$ between the p-th and the q-th receive antennas can be calculated as follows:

$$\rho_{RX}^{(pq)} = E\{c_{pt} c_{qt}^*\} \quad \text{eq. (20)}$$

with $1 \le t \le n_T$

The statistical mean $E\{\cdot\}$ may be replaced in a practical receiver implementation as a temporal mean over subsequent realizations of the channel matrix $\underline{H}$. It is then possible to say that the receiver 115 is able to estimate two indicators $\rho_{TX}$ and $\rho_{RX}$ that represent the level of correlation at the transmitter 105 and at the receiver 115 of the MIMO system 100. These indicators can be quantized in a suitable number of levels (e.g. low, medium, high correlation) and each couple of values of $\rho_{TX}$ and $\rho_{RX}$ can be used to select the proper set of SINR thresholds that are used for determining the CQI of each codeword.

In general, the radio link performance degrades as the fading correlation increases and thus the correspondent SINR thresholds that enable the use of a specific MCS are expected to increase with respect to an uncorrelated channel.

In a similar way, also the user terminal speed (mobile speed) v can be estimated at the user equipment receiver 115 by means of the received training sequences (block 240 in the flow diagram of FIG. 2B), and the correspondent values can be used to select the proper set of SINR thresholds. In general, an increment of the mobile speed v causes an increment of the Doppler spread and thus of the Inter-Carrier Interference (ICI) that degrades the radio link performance.

By denoting as $TH^{(n)} = \{TH_1^{(n)}, TH_2^{(n)}, ... TH_L^{(n)}\}$ the n-th set of SINR thresholds with $1 \le n \le N$, the selected set will be a function of the estimated transmit and receive correlation and of the estimated user terminal speed (block 245 in the flow diagram of FIG. 2B):

$$TH^{(n)} = f(\rho_{TX}, \rho_{RX}, v) \quad (21)$$

In an embodiment of the present invention, the three indicators $\rho_{TX}$, $\rho_{RX}$ and v are used together to determine the most suitable set of SINR thresholds. However, the present invention is not limited to the use of all these three indicators: one subset of these indicators, and/or other indicators can be used for the same purpose.

Figure 3:
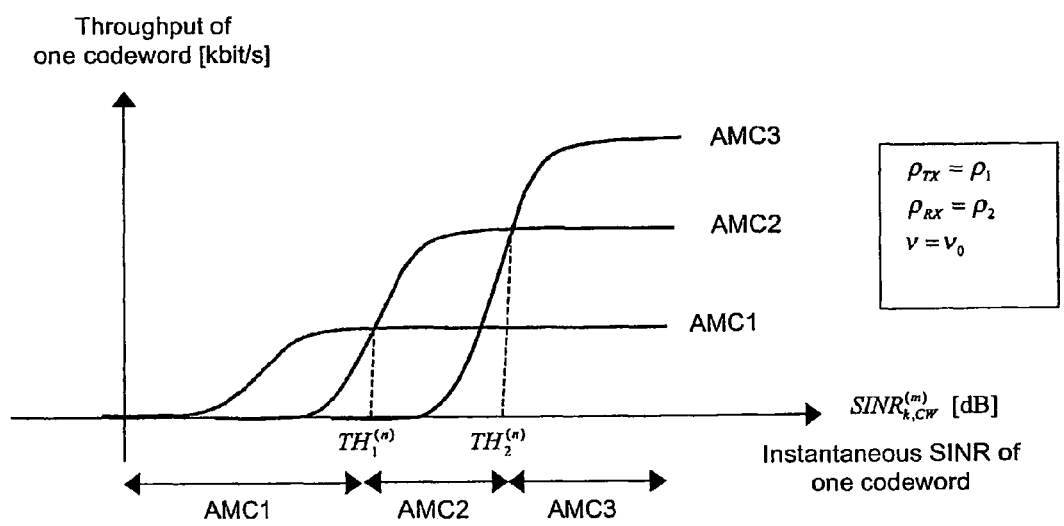
FIG. 3 depicts exemplary curves of the performance of one codeword for three exemplary AMC states in terms of throughput as a function of the instantaneous SINR of each codeword.

FIG. 3 provides a graphical representation of the step described above, where for simplicity the AMC procedure is assumed to be composed by only three states AMC1, AMC2 and AMC3. Each state is characterized by a specific modulation scheme and coding rate. For example, the state AMC1 uses the QPSK modulation, the state AMC2 uses the 16-QAM modulation and the state AMC3 uses the 64-QAM modulation. The channel coding rate of the three AMC states are denoted respectively as $r_1$, $r_2$ and $r_3$ and all are comprised between 0 and 1. Each AMC state is characterized separately in terms of performance by means of numerical simulations or experimental measurements.

The exemplary curves AMC1, AMC2, AMC3 of FIG. 3 show the performance of one codeword for the three AMC states AMC1, AMC2, AMC3 in terms of throughput (in ordinate, kbit/s) as a function of the instantaneous SINR (in abscissa, dB) of each codeword calculated at the input of the spatial demultiplexing block 160 with one of the equations (15)-(17) or with any other function that maps the SINR of the layers over the correspondent codeword. The ordinate in FIG. 3 can also be expressed with respect to other radio quality metrics such as Block Error Rate (BLER), Bit Error Rate (BER) or other. The curves in FIG. 3 refer to specific values of the correlation indicators $\rho_{TX}=\rho_1$ and $\rho_{RX}=\rho_2$ and of the mobile speed $v=v_0$. $TH_1^{(n)}$ and $TH_2^{(n)}$ are the SINR thresholds calculated for such specific values of the correlation indicators and of the mobile speed. For other values of these parameters the curves of FIG. 3 and the correspondent intersections (i.e. SINR thresholds) will be different.

FIG. 3 shows that for SINR values lower than the threshold $TH_1^{(n)}$ it is optimum the state AMC1, for values comprised between $TH_1^{(n)}$ and $TH_2^{(n)}$ it is optimum the state AMC2 and for SINR values greater than $TH_2^{(n)}$ it is optimum the state AMC3.

Thus, according to an embodiment of the present invention, the SINR values $SINR_{u,CW}^{(m)}$ calculated with the equation (15)-(17) are compared with the SINR thresholds $TH_1^{(n)}$ and $TH_2^{(n)}$ (block 250 in the flow diagram of FIG. 2B) and, based on such comparison, for each codeword, the optimum AMC state or CQI is determined (block 255 in the flow diagram of FIG. 2B).

These operations are repeated for al the groups of subcarriers (block 260 in the flow diagram of FIG. 2A).

The receiver 115 thus only needs to store N sets of SINR thresholds, each set being composed of L SINR threshold values.

In an alternative embodiment of the present invention, the receiver 115 is provided with a set of performance curves like those illustrated in FIG. 3. Each performance curve, stored in a memory of the receiver 115, provides the throughput of one codeword for one specific Modulation and Coding Scheme (MCS) and for a specific value of the correlation parameters $\rho_{TX}$, $\rho_{RX}$ and user terminal speed v. These curves can be determined by numerical simulation or by experimental measurements.

Figure 4:
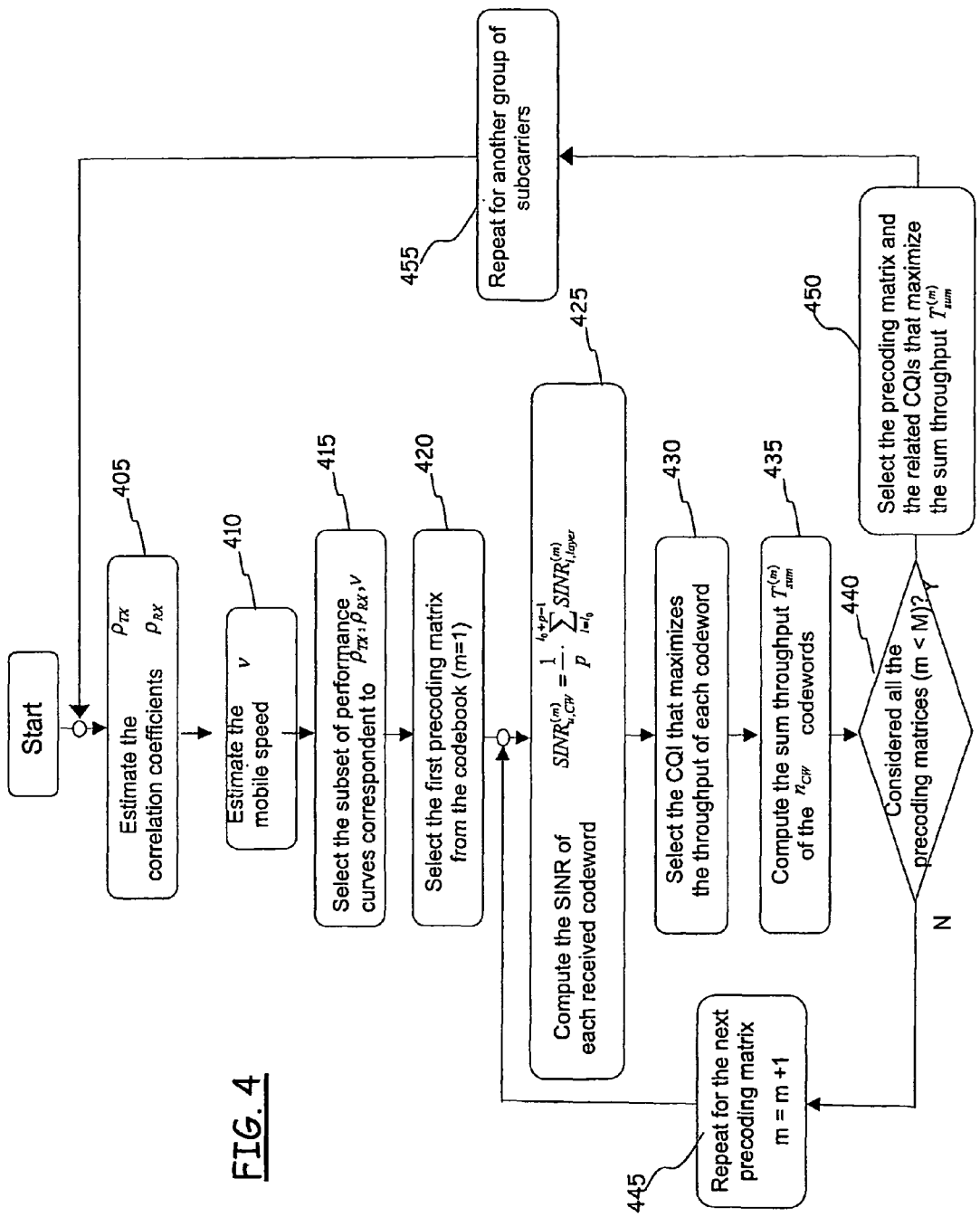
FIG. 4 is a flow diagram of a method according to an alternative embodiment of the present invention.

As schematized in the flow diagram of FIG. 4, in this alternative invention embodiment the receiver 115 performs the following steps in order to determine the optimum precoding matrix and the optimum CQI of each codeword:
1) estimation of the correlation at the transmitter $\rho_{TX}$ and at the receiver $\rho_{RX}$ (block 405);
2) estimation of the user terminal speed v (block 410);
3) selection of the performance curves (FIG. 3) correspondent to the values $\rho_{TX}$, $\rho_{RX}$ and v estimated at steps 1) and 2) that provide the throughput of one codeword for the different CQIs as a function of the SINR ratio (block 415);
4) selection of the first precoding matrix in the codebook (block 420) and
5) for each precoding matrix of the codebook (loop 425-445):
6) computation of the SINR of each codeword by means of the equations (14)-(17) (block 425);
7) select the CQI that maximizes the throughput of each codeword by means of the performance curves selected at the step 3) (block 430). For this purpose the SINR values calculated at step 6 are used as entry value in the abscissa of the performance curves selected at step 3;
8) compute the sum throughput $T_{sum}^{(m)}$ of the $n_{CW}$ codewords for the m-th matrix of the codebook using the CQIs determined at step 7) (block 435);
9) repeat the steps 6), 7) and 8) for each precoding matrix in the codebook (i.e. for $1 \leq m \leq M$); M sets are obtained, where each set is composed by $n_{CW}$ SINR values
10) select the precoding matrix that maximizes the sum throughput of the $n_{CW}$ codewords together with the correspondent CQIs determined at step 7) (block 450).

These operations are then repeated for a different group of subcarriers (block 455).

The persons skilled in the art may note that the proposed method is applicable with any type of receiver and avoids the calculation of the SINR at the output of the spatial demultiplexing block that can be a difficult task in case of non-linear receivers. The actual performance of the particular receiver implementation, including the non-idealities and the corresponding implementation margins, are embedded in the set of SINR thresholds that are used to determine the CQI of each codeword.

The present invention has been here described making reference to some possible, exemplary embodiments thereof. Those skilled in the art will recognize that other embodiments are possible, all falling within the scope of the invention as defined by the appended claims.

The invention claimed is:
1. A method for selecting a precoding matrix to be used in a MIMO communication system comprising a transmitter, a receiver and a communication channel, wherein the precoding matrix is used by the transmitter to precode codewords to be transmitted to the receiver over the communication channel, the method comprising:
calculating, by the receiver, power of received signal layers;
determining, by the receiver, an optimum precoding matrix within a codebook of precoding matrices based on a metric related to the power of received signal layers, wherein the determining comprises selecting the optimum precoding matrix for which a product of the powers of the received signal layers is minimized; and
feeding back, by the receiver to the transmitter, an indication to enable the transmitter to select the optimum precoding matrix from the codebook.

2. The method of claim 1, wherein determining the optimum precoding matrix is performed on the received signal layers before spatially demultiplexing the received signal layers.

3. The method of claim 2, further comprising:
   determining, by the receiver, using the optimum precoding matrix, a respective optimum channel quality indicator for each of said codewords; and
   feeding back, by the receiver to the transmitter an indication of the optimum channel quality indicator to enable the transmitter to select an optimum modulation and coding scheme to be used for each of said codewords.

4. The method of claim 3, wherein determining the optimum channel quality indicator comprises calculating instantaneous signal to interference and noise ratio of each received codeword.

5. The method of claim 4, wherein said calculating the instantaneous signal to interference and noise ratio of each received codeword comprises calculating the instantaneous signal to interference and noise ratio of each received layer before spatial demultiplexing.

6. The method of claim 5, wherein said determining the optimum channel quality indicator comprises setting thresholds for the signal to interference and noise ratio and comparing a calculated signal to interference and noise ratio with said thresholds.

7. The method of claim 6, wherein said thresholds are dynamically calculated by the receiver as a function of calculated values of predetermined parameters.

8. The method of claim 7, wherein said parameters comprise at least one among correlation coefficients between transmit antennas of the transmitter, correlation coefficients between receive antennas at the receiver, and a speed of movement of the receiver relative to the transmitter.

9. The method of claim 1, comprising repeating the method for selecting a precoding matrix for every group of subcarriers.

10. A method for selecting a precoding matrix to be used in a MIMO communication system comprising a transmitter, a receiver and a communication channel, wherein the precoding matrix is used by the transmitter to precode codewords to be transmitted to the receiver over the communication channel, the method comprising:
    calculating, by the receiver, power of received signal layers;
    determining, by the receiver, an optimum precoding matrix within a codebook of precoding matrices based on a metric related to the power of received signal layers, wherein said determining the optimum procoding matrix comprises:
       calculating, for each precoding matrix in the codebook, an instantaneous signal to interference and noise ratio of each received codeword before spatial demultiplexing;
       selecting a channel quality indicator that maximizes a throughput of each received codeword;
       calculating a sum of throughputs of received codewords; and
       selecting, as the optimum preceding matrix, one of the precoding matrices for which a calculated sum of throughputs is maximized; and
    feeding back, by the receiver to the transmitter, an indication to enable the transmitter to select the optimum precoding matrix from the codebook.

11. The method of claim 10, further comprising selecting as an optimum channel quality indicator, the channel quality indicator which maximizes the calculated sum of throughputs.

12. A MIMO receiver configured to select a precoding matrix to be used in a MIMO communication system comprising a transmitter, the receiver and a communication channel, wherein the precoding matrix is used by the transmitter to precode codewords to be transmitted to the receiver over the communication channel, the receiver being configured to:
    calculate power of received signal layers;
    determine an optimum precoding matrix within a codebook of precoding matrices based on a metric related to the power of received signal layers, wherein the determining comprises selecting the optimum precoding matrix for which a product of the powers of the received signal layers is minimized; and
    feed back to the transmitter an indication to enable the transmitter to select the optimum precoding matrix from the codebook.

* * * * *